United States Patent [19]

McBrien

[11] 4,113,926

[45] Sep. 12, 1978

[54] CELL RACKS

[75] Inventor: Roderick Julian McBrien, Tonbridge, England

[73] Assignee: Chloride Group Limited, London, United Kingdom

[21] Appl. No.: 825,718

[22] Filed: Aug. 18, 1977

[30] Foreign Application Priority Data

Aug. 20, 1976 [GB] United Kingdom ............... 34842/76

[51] Int. Cl.$^2$ ........................................... H01M 2/10
[52] U.S. Cl. .................................................... 429/99
[58] Field of Search .................. 429/99, 100; 180/68.5

[56] References Cited

U.S. PATENT DOCUMENTS

| | | | |
|---|---|---|---|
| 3,623,917 | 11/1971 | Chassoux | 429/99 |
| 3,846,179 | 11/1974 | Shaw | 429/99 |
| 4,020,244 | 4/1977 | Selinko | 429/99 |

Primary Examiner—Donald L. Walton
Attorney, Agent, or Firm—Oblon, Fisher, Spivak, McClelland & Maier

[57] ABSTRACT

A cell rack includes two generally planar rectangular end elements and any number of spacer elements of spider form. Each rack element affords horizontal surfaces for supporting an adjacent cell and a number of vertical surfaces for spacing the cell from the rack elements and further vertical surfaces for restraining lateral movement of the cells.

The cells and racks elements are held together in a single unit by four tie rods which pass through respective corners of the rack elements.

11 Claims, 4 Drawing Figures

CELL RACKS

BACKGROUND OF THE INVENTION

This invention relates to racks for supporting and holding together two or more rectangular electric cells so that they may be conveniently used or transported as a single unit.

SUMMARY OF THE INVENTION

According to the present invention a rack for supporting or holding together two or more rectangular electric cells with their end walls coplanar and their side walls parallel comprises three or more generally planar rack elements which are arranged in spaced planes parallel to the side walls of the cells with a cell between each neighbouring pair of rack elements, each rack element affording, in the region of each corner of each adjacent side wall, a vertical spacing surface lying flat against the side wall of each adjacent cell, and having a portion projecting beyond the side wall, each projecting portion adjacent a bottom corner affording a horizontal supporting surface to engage the bottom of a cell, and each projecting portion adjacent an upper corner and/or a lower corner affording a vertical locating surface to engage an end wall of the cell to restrain lateral movement parallel to the side walls, and tie members extending horizontally along the end walls, engaging the projecting portions of the rack elements and arranged to connect the rack elements together to hold the cells and rack elements together in a stack.

Preferably means are provided which draw the rack elements together to positively hold the cells and rack elements together in a stack. Each projecting portion of the rack elements preferably affords a vertical locating surface to engage an end wall of a cell to restrain lateral movement of the cells parallel to the side walls.

Conveniently each rack element is formed of insulating material.

In a preferred construction, the two rack elements which form the ends of the rack comprise generally rectangular plates whose four corners afford the projecting portions. Preferably the, or each, intermediate rack element, which may be termed a spacer element, is of spider form having radiating arms, the ends of which afford the projecting portions.

The bottom tie members are preferably below the level of the bottoms of the cells, and the top tie members are preferably spaced apart horizontally beyond the planes of the end walls of the cells.

Preferably the lower tie members are rods each having a screw thread provided with a nut at at least one end. The upper tie members are preferably rectangular section bars. The rack elements may be located with respect to the upper tie members in a variety of ways, but this is preferably achieved by one or more screws which pass through a hole formed in each rack element and engage the rectangular bars.

BRIEF DESCRIPTION OF THE DRAWING

Further features and details of the invention will be apparent from the following description of one specific embodiment which is given by way of example only with reference to the accompanying drawings in which.

DETAILED DESCRIPTION OF THE ILLUSTRATED EMBODIMENT

Figure 1:
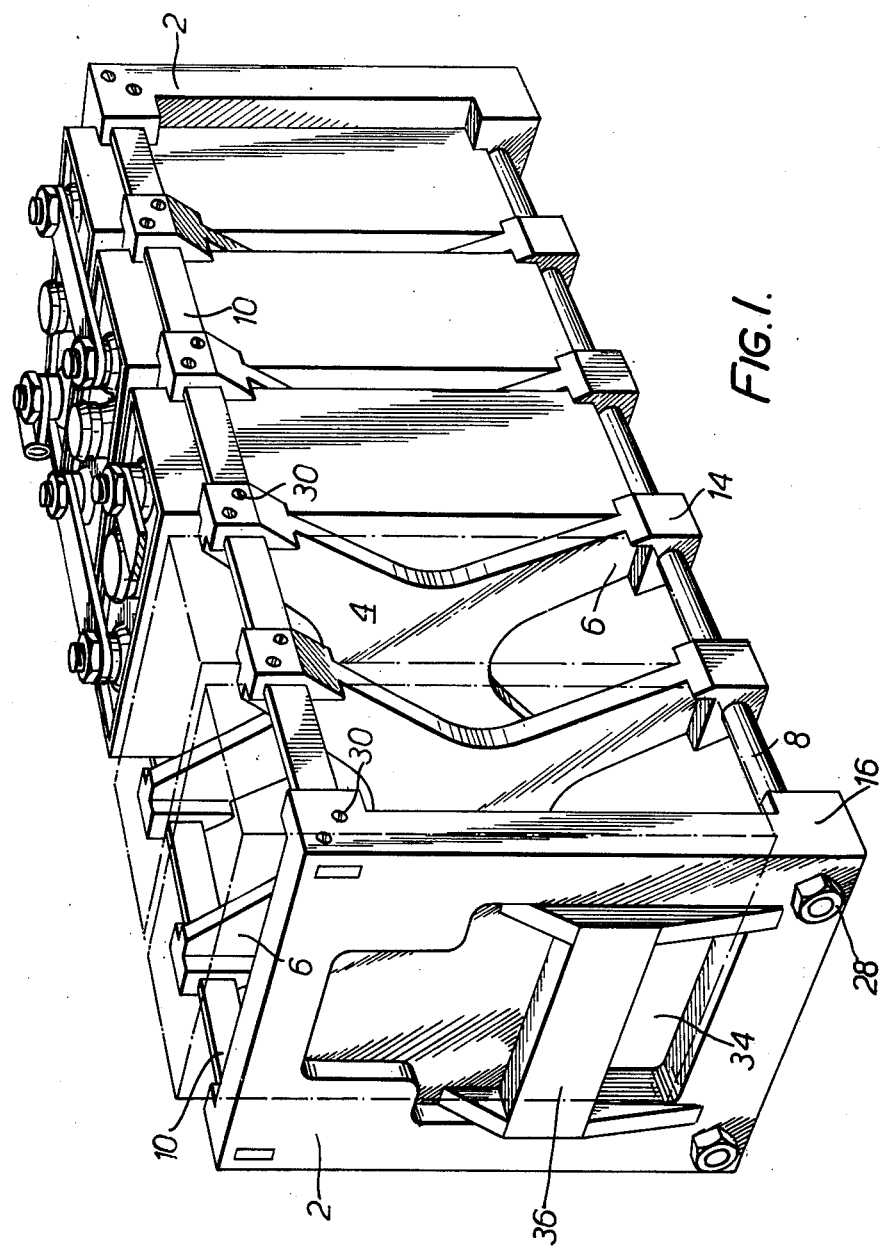
FIG. 1 is a perspective view of a rack for five alkaline cells, showing three cells in position.
Figure 2:
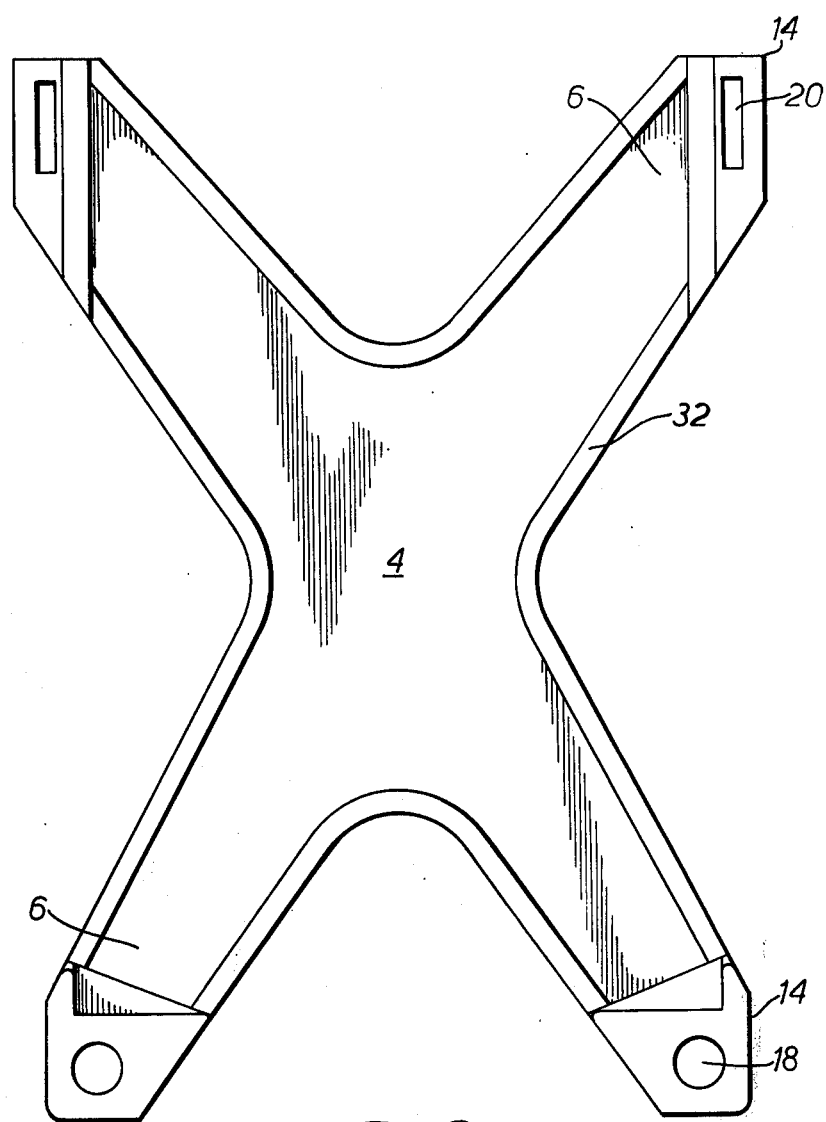
FIG. 2 is an elevation of a single spacer element.

The rack comprises two generally planar rectangular end elements 2, and four generally planar spacer elements 4 of spider form, each having four radiating arms 6 and formed of a moulded plastics material. As shown in FIG. 1, the six rack elements are assembled with a cell between each adjacent pair to form a stack with the corresponding ends of the cells coplanar and are interconnected by means of two connecting rods 8 of circular section and two connecting rods 10 of rectangular section extending perpendicular to the planes of the rack elements through holes formed in the projecting portions of the rack elements.

Figure 3:
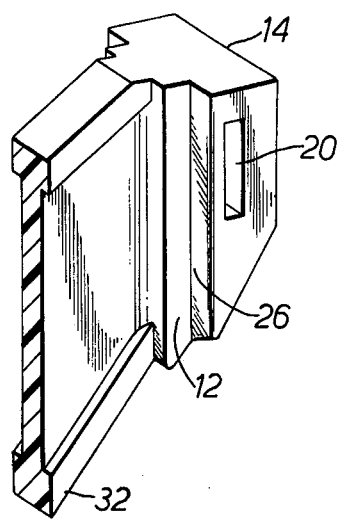
FIG. 3 is a scrap perspective view of an upper corner of a spacer element.
Figure 4:
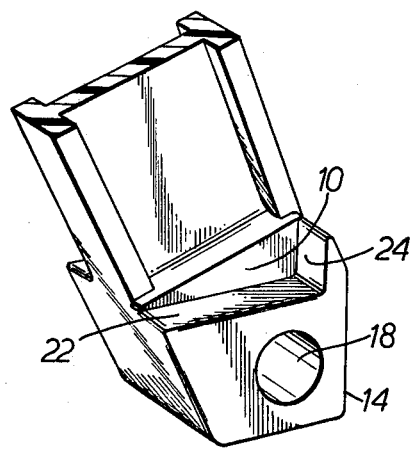
FIG. 4 is a scrap perspective view of a lower corner of a spacer element.

As best seen in FIGS. 3 and 4, each rack element affords a vertical spacing surface 10 adjacent each bottom corner which lies flat against and locates the side wall of the adjacent cell and spaces the remainder of the element away from the cell. Each element also affords a similar spacing surface 12 adjacent each upper corner.

The end of each arm of each spacer element is provided with a projection 14 which projects parallel to the connecting rods on both sides of the spacer elements, while each corner of each end element 4 is provided with a projection 16 which projects inwards towards the remainder of the rack.

Each lower projection on the spacer and end elements is formed with a circular hole 18 while each upper projection of the spacer elements and the upper corners of the end elements is formed with a rectangular hole 20 for receiving the connecting rods 8 and 10, respectively.

Each bottom corner of each rack element affords a flat horizontal surface 22, for supporting the weight of each adjacent cell, and a flat vertical locating surface 24 which engages the end walls of the adjacent cells and restrains lateral movement of the cells parallel to their side walls.

Each upper projection of each rack element also affords a flat vertical locating surface 26 which engages the end walls of the adjacent cells and helps to restrain lateral movement of the cells. The locating surfaces 10 and 12 hold the plastics tie rods spaced away from the walls of the cells. The bottom connecting rods 8 are below the level of the bottoms of the cells and the top connecting rods 10 are spaced apart horizontally beyond the planes of the end walls of the cells.

The lower connecting rods 8 are of circular section and have screw threaded ends, each carrying a nut 28 to draw the rack elements and cells together. The upper connecting rods are of rectangular section and are secured in position by set screws 30 which pass through the upper corners of the rack elements. A rectangular section is found to be preferable for the upper connecting rods 10 since this enables the overall width of the rack to be somewhat less than would be the case if circular rods were used.

Each arm 6 of the spacer elements 4 is of generally H section, having a flange 32 formed integrally with each of its edges extending perpendicular to its plane and on both sides of it. The provision of these flanges increases the rigidity of the rack elements without significantly increasing their weight or manufacturing cost.

In use, a nut 28 is screwed on to one end of each lower connecting rod 8 which is then inserted into a corresponding hole in each of the rack elements. A further nut is then loosely threaded on to the other end of each lower connecting rod. The cells are now inserted in turn into the rack, each between two rack elements, and the upper connecting rods 10 are slid into place. The nuts 28 are now tightened, thus forcing the vertical spacing surfaces of each element into contact with the adjacent cell so that the five cells and six rack elements form a rigid unit. Set screws 30 are now inserted into holes formed in the upper corners of the rack elements and tightened until they engage the upper connecting rods.

The arms of the spacer elements lie approximately along the diagonals of the side walls of the cells. Each cell is supported by the four horizontal supporting surfaces afforded by the adjacent rack elements and is secured against lateral movement in the planes of the rack elements by the vertical surfaces 24 and 26 afforded by the upper and lower projections on the rack elements.

In use, the spider construction of the spacer elements permits air to circulate around the cells and cool them if necessary. For the same purpose the end plates are formed with holes 34. A web 36 situated above the hole 34 proud of the plane of the end elements provides a handle by which the rack may be lifted.

In a typical example, the plastics material of the spacing element is 5 mm thick, the flanges extend a further 2½ mm in either direction, the spacing surface of each arm is 15 mm thick and the projections extend 15 mm on both sides of the planes of the rack elements.

It will be appreciated that a great many modifications and alterations may be made to the example described above. For instance, the rack elements and connecting rods could be of steel or nickel plated steel, the connecting rods could be of any section and the spacer elements need not be of spider form. The end elements may also be of spider form identical to the spacer elements. In addition, the dimensions and number of the rack elements may be altered in accordance with the user's requirements and the size and number of cells.

What I claim as my invention and desire to secure by Letters Patent is:

1. A rack supporting and holding together two or more rectangular electric cells side by side with their end walls coplanar and their side walls parallel, comprising two generally planar rack elements forming the ends of the rack and at least one additional generally planar intermediate rack element of spider form having radiating arms, the rack elements being arranged in spaced planes which in use will be parallel to the side walls of the cells with a cell between each neighbouring pair of rack elements, each rack element affording, in the region of each corner of each adjacent side wall, a vertical spacing surface lying flat against the side wall of each adjacent cell, and having a portion projecting beyond the side wall, each projecting portion adjacent a bottom corner affording a horizontal supporting surface to engage the bottom of the cell, and each projecting portion adjacent an upper corner and/or a lower corner affording a vertical locating surface to engage an end wall of the cell to restrain lateral movement parallel to the side walls, and tie members extending horizontally along the end walls, engaging the projection portions of the rack elements and arranged to connect the rack elements together to hold the cells and rack elements together in a stack.

2. A rack as claimed in claim 1 in which means are provided which draw the rack elements together to positively hold the cells and rack elements together in a stack.

3. A rack as claimed in claim 1 in which each projecting portion of the rack elements affords a vertical locating surface to engage an end wall of a cell to restrain lateral movement of the cells parallel to the side walls.

4. A rack as claimed in claim 1 in which the two rack elements which form the ends of the rack comprise generally rectangular plates whose four corners afford the projecting portions.

5. A rack as claim in claim 1 in which the rack elements are formed of insulating material.

6. A rack as claimed in claim 1 in which the upper tie members are rectangular section bars the width of each of which is less than its height.

7. A rack as claimed in claim 1 in which the rack elements are located with respect to the upper tie members by means of one or more screws which pass through a hole formed in each rack element and engage the rectangular bars.

8. A rack as claimed in claim 1 in which the bottom tie members are rods, each having a screw thread provided with a nut at at least one end.

9. A rack as claimed in claim 5 in which the tie members are formed of plastics material and are spaced from the cells.

10. A rack as claimed in claim 1 in which the bottom tie members are below the level of the bottoms of the cells.

11. A rack as claimed in claim 1 in which the top tie members are spaced apart horizontally beyond the planes of the end walls of the cells.

* * * * *